United States Patent
Imai et al.

(10) Patent No.: US 6,300,518 B1
(45) Date of Patent: Oct. 9, 2001

(54) AQUEOUS HYDROXYLAMINE SOLUTION

(75) Inventors: Naoshi Imai; Kouzou Toguro, both of Gumma (JP)

(73) Assignee: Nissin Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/816,340

(22) Filed: Mar. 26, 2001

(30) Foreign Application Priority Data

Mar. 24, 2000 (JP) .................................................. 12-083528

(51) Int. Cl.⁷ .......................... C07C 239/08; C01B 21/14
(52) U.S. Cl. ................................. 564/2; 564/301
(58) Field of Search ......................... 564/2, 301

(56) References Cited

U.S. PATENT DOCUMENTS

| | | | | |
|---|---|---|---|---|
| 5,783,161 | * | 7/1998 | Schneider et al. | 423/265 |
| 5,808,150 | * | 9/1998 | Michelotti | 564/2 |
| 5,906,805 | * | 5/1999 | Chang et al. | 423/265 |

FOREIGN PATENT DOCUMENTS

| | | | | |
|---|---|---|---|---|
| 97/22549 | * | 6/1997 | (WO) | C01B/21/14 |
| 98/49099 | * | 11/1998 | (WO) | C01B/21/14 |

* cited by examiner

*Primary Examiner*—Sreeni Padmanabhan
*Assistant Examiner*—Brian J. Davis
(74) *Attorney, Agent, or Firm*—Nixon Peabody LLP; Jeffrey L. Costellia

(57) ABSTRACT

An aqueous hydroxylamine solution containing hydroxylamine in an amount of 30 wt. % or more, which contains iron in an amount of not more than 10 ppb, metal components other than iron in an amount of not more than 5 ppb for each metal component and trans-1,2-diaminocyclohexane-N,N,N',N'-tetraacetic acid in an amount of 0.0005 to 0.5 wt. % is obtained by distillation of a concentrated aqueous crude hydroxylamine solution using a specifically surface treated distilling apparatus.

12 Claims, 1 Drawing Sheet

FIGURE
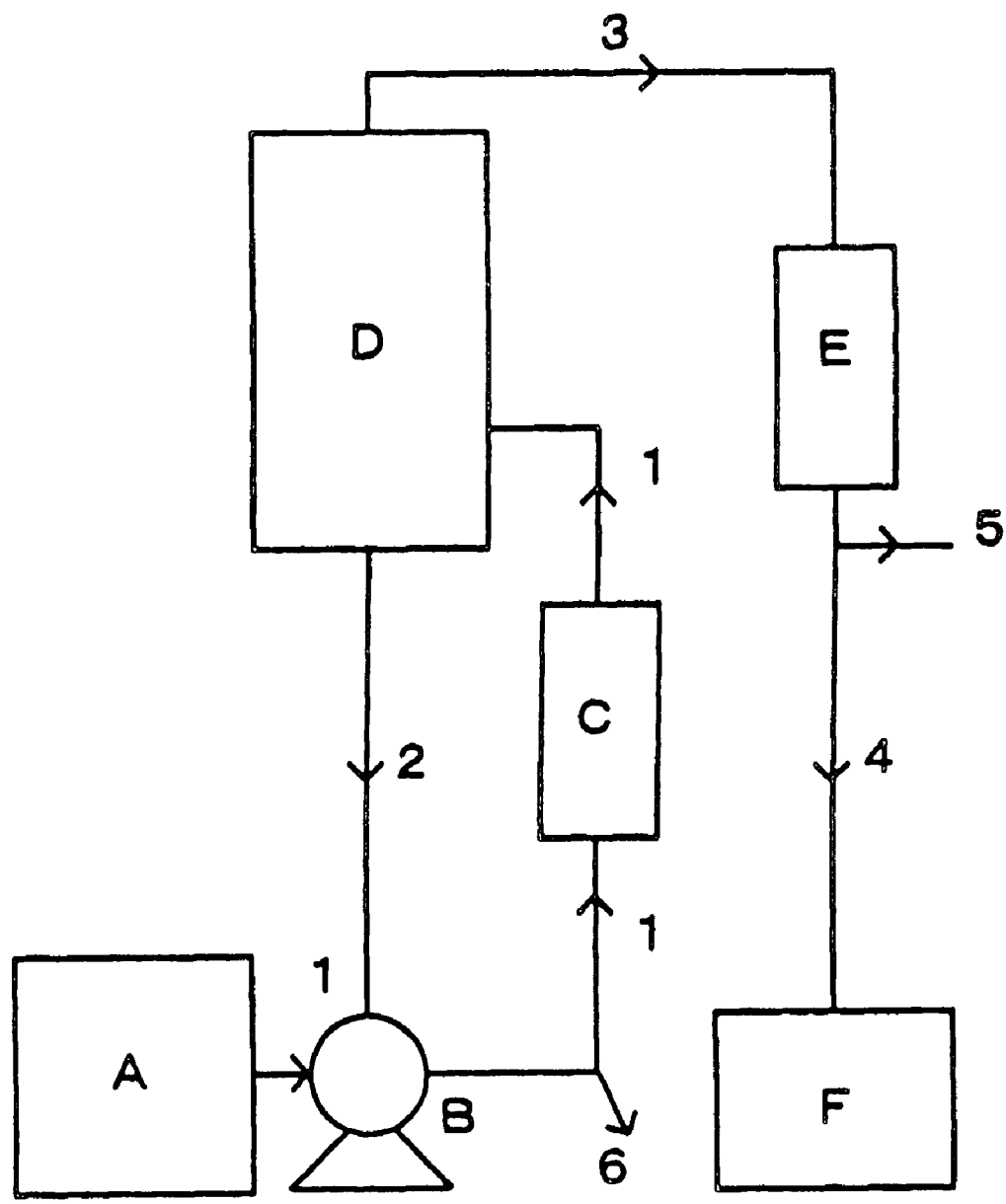

AQUEOUS HYDROXYLAMINE SOLUTION

FIELD OF THE INVENTION

This invention relates to a highly-concentrated and highly-purified aqueous solution of free hydroxylamine (which is not in the form of a salt). The invention particularly relates to a highly-concentrated aqueous hydroxylamine solution containing almost no metal components and having such high stability that the solution is advantageously used for processing or washing electronic devices.

BACKGROUND OF THE INVENTION

An aqueous hydroxylamine solution has been hitherto used, for instance, as a processing solution or detergent for producing electronic devices. In particular, a highly-concentrated and highly-purified aqueous hydroxylamine solution containing almost no impurities (particularly, metal components) has been recently required, for example, for washing very small and highly-integrated electronic devices such as semiconductor IC chips.

Hydroxylamine ($NH_2OH$) is generally synthesized by a known method. In the method, sodium bisulfite and sodium nitrite are reacted in an aqueous phase to prepare an aqueous solution of sodium hydroxylamine sulfonate, which is then hydrolyzed to obtain an aqueous hydroxylamine sulfate solution. The obtained solution is neutralized with sodium hydroxide to give an aqueous free hydroxylamine solution.

Hydroxylamine normally takes the form of crystals at room temperature, and its melting and boiling points are 33° C. and 57° C. (at 20 mmHg), respectively. The crystals of hydroxylamine are known to be explosive when heated, and an aqueous hydroxylamine solution is also known to be so unstable that it is liable to rapidly decompose. For this reason, an aqueous solution of stable hydroxylamine salt is beforehand prepared, and the free hydroxylamine is produced when it is used in industry. Since this process is troublesome and inconvenient, it has been desired to find out a stabilizing agent specifically effective for free hydroxylamine. Examples of the stabilizing agents hitherto having been proposed include 8-hydroxyquinoline (Japanese Patent Provisional Publication No. 57-100908), 1,10-phenanthroline (Japanese Patent Provisional Publication No. 58-69841), bipyridine (Japanese Patent Provisional Publication No. 58-69842), thiocarboxylic acids (Japanese Patent Provisional Publication No. 58-69843) and quinoline (Japanese Patent Provisional Publication No. 58-69844). Further, WO 97/22549 and U.S. Pat. No. 5,783,161 teach that trans-1,2-diaminocyclohexane-N,N,N',N'-tetraacetic acid effectively stabilizes free hydroxylamine.

The already proposed stabilizing agents, however, are not fully effective when used in a normal manner. In addition, a prepared aqueous hydroxylamine solution generally contains impurities such as metal components (e.g., iron, aluminum, alkali metals such as sodium and potassium), which are originally contained in the starting materials or introduced in the preparation process.

In order to prepare a highly-purified aqueous free hydroxylamine solution suitable for processing or washing semiconductor devices, concentration and distillation by heating are indispensable. However, these treatments are liable to cause explosion, and hence it is very difficult to safely distill the aqueous hydroxylamine solution (which is unstable and corrosive) keeping its distillate from contamination with impurities.

SUMMARY OF THE INVENTION

The present invention provides a highly-concentrated and highly-purified aqueous (free) hydroxylamine solution which contains, in particular, almost no metal components such as iron. The invention also provides a process for safely and easily preparing the aqueous hydroxylamine solution.

The inventors already found a stabilizing agent by which an aqueous free hydroxylamine solution is stabilized effectively enough to safely concentrate and distill by heating, which is trans-1,2-diaminocyclohexane-N,N,N',N'-tetraacetic acid (CDTA). The CDTA makes it easy to store and transport an aqueous free hydroxylamine solution. Further, the CDTA makes it possible to safely produce and supply a purified aqueous hydroxylamine solution containing sodium and potassium in an amount of 30 to 100 ppb for each and iron in an amount of 50 to 100 ppb. However, the purity of this level is still not advantageous for treating electronic devices. In order to further purify the aqueous hydroxylamine solution, the solution must be further concentrated and distilled by heating. Such severe distillation procedure is not easy, because a distilling apparatus is easily corroded by hydroxylamine to release new impurities.

The present inventors have further studied and finally discovered that a highly-purified aqueous hydroxylamine solution can be obtained by distilling an aqueous crude hydroxylamine solution (hereinafter, referred to as "crude solution") in the presence of the specific stabilizing agent (trans-1,2-diaminocyclohexane-N,N,N',N'-tetraacetic acid) using a stainless steel-made distilling apparatus which preferably has equipment (e.g., spatter separator) for keeping spatters of the concentrated solution from contaminating the resulting solution and which has an inside surface treated with an aqueous hydroxylamine salt so that the surface may not be corroded to release impurities. Thus prepared aqueous hydroxylamine solution is much more pure than the crude solution, and therefore is suitable for the use in washing semiconductor devices.

The invention resides in an aqueous hydroxylamine solution containing hydroxylamine in an amount of not less than 30 weight %, which contains iron in an amount of not more than 10 ppb, metal components other than iron in an amount of not more than 5 ppb for each metal component and trans-1,2-diaminocyclohexane-N,N,N',N'-tetraacetic acid in an amount of 0.0005 to 0.5 weight %.

The invention further resides in a process for the preparation of a highly purified aqueous hydroxylamine solution, comprising the steps of:

heating in a vessel an aqueous crude hydroxylamine solution containing 40 to 60 weight % of hydroxylamine and 15 to 200 ppb of iron, in the presence of trans-1,2-diaminocyclohexane-N,N,N',N'-tetraacetic acid in an amount of 0.0005 to 0.5 weight % based on the weight of the crude solution, to distill water off and to give a concentrated aqueous hydroxylamine solution containing hydroxylamine in an amount of 70 to 95 weight %; and distilling the concentrated aqueous hydroxylamine solution to give an aqueous hydroxylamine distillate by means of a stainless steel-made distilling apparatus of which inner surface has been previously treated with an aqueous hydroxylamine salt solution.

The preferred embodiments of the invention are as follows.

(1) The aqueous hydroxylamine solution, wherein the amount of iron is not more than 5 ppb (more preferably, not more than 3 ppb).

(2) The aqueous hydroxylamine solution, wherein the amounts of sodium and potassium are not more than 2 ppb (more preferably, not more than 1 ppb) for each.

(3) The aqueous hydroxylamine solution, wherein the amounts of metal components other than iron are not more than 2 ppb (more preferably, not more than 1 ppb) for each.

(4) The distilling apparatus is equipped with a device for keeping a distilled aqueous hydroxylamine solution from contamination with the concentrated solution which spatters in the vessel.

(5) The concentrated aqueous hydroxylamine solution is distilled, while a portion of the concentrated aqueous hydroxylamine solution is taken out from the vessel.

(6) The concentrated aqueous hydroxylamine solution taken out from the vessel is mixed with a freshly supplied aqueous crude hydroxylamine solution to give an aqueous mixture which is then supplied into the vessel.

(7) A portion of the concentrated aqueous hydroxylamine solution taken out from the vessel is wasted before the mixing.

(8) Trans-1,2-diaminocyclohexane-N,N,N',N'-tetraacetic acid is supplemented to the aqueous hydroxylamine distillate.

BRIEF DESCRIPTION OF THE DRAWING

FIGURE is a flow sheet of a distilling apparatus advantageously used for preparing a purified aqueous hydroxylamine solution of the invention.

DETAILED DESCRIPTION OF THE INVENTION

The process for preparing an aqueous hydroxylamine solution of the invention is described below by referring to the attached drawing.

The distilling apparatus shown in FIGURE is composed of a material tank A for storing the starting material (i.e., crude aqueous hydroxylamine solution), a circulating pump B which continuously leads the starting material from the tank A to a heater C and then to an evaporating can D through a transferring line 1, a condenser E for cooling a purified hydroxylamine gas separated from spatters of the material and led through a gas-transferring line 3 connecting to the upper part of the evaporating can D, a pressure-reducing line (vacuum pump) 5 connecting to the outlet line of the condenser E, and a product tank F for storing the resultant purified aqueous hydroxylamine solution which is condensed from the vapor containing hydroxylamine gas and which is led through a condensed liquid-transferring line 4 connecting to the condenser E. The pressure-reducing line (vacuum pump) 5 keeps the internal pressure of the apparatus (evaporating can D, gas-transferring line 3, condenser E) at a predetermined level. A circulating line 2 is connected to the lower part of the evaporating can D, and a distillation residue of the concentrated solution in the evaporating can D is sent back to the starting material by the pump B through the line 2. A blow line 6 is provided between the pump B and the heater C, and a portion of the distillation residue is removed through the blow line 6 so as to keep the content of impurities at an allowed level.

The evaporating can D (the main part of the distilling apparatus) is equipped with a spatter separator (not shown) for keeping spatters of the concentrated solution from entering the resulting solution. The evaporating can D is made of stainless steel, and its inside surface is beforehand treated with an aqueous solution of hydroxylamine salt (e.g., hydroxylamine sulfate, hydroxylamine phosphate, hydroxylamine chloride) so as not to be corroded when it is kept into contact with corrosive hydroxylamine. The anticorrosive treatment can be performed by heating the inside surface at an atmospheric pressure in the presence of an aqueous hydroxylamine solution salt (approx. 0.2 to 20 wt. %) at approx. 50 to 200° C. for more than approx. 3 minutes.

The aqueous hydroxylamine solution of the invention can be prepared using the distilling apparatus of Figure in the following manner.

First, the aqueous crude hydroxylamine solution (starting material) is supplied into the material tank A. The crude solution can be prepared by the aforementioned known method. Generally, the crude solution contains not small amounts of impurities of non-volatile metal components such as iron, aluminum, sodium, potassium and calcium. The contents of hydroxylamine and iron in the starting material of the crude solution are in the ranges of 40 to 60 wt. % and 15 to 200 ppb, respectively. Prior to distillation, trans-1,2-diaminocyclohexane-N,N,N',N'-tetraacetic acid (CDTA) is added to the crude solution in an amount of 0.0005 to 0.5 wt. % based on the weight of the solution. CDTA stabilizes the crude solution to keep hydroxylamine from decomposing.

The circulating pump B continuously sends the starting material (crude aqueous hydroxylamine solution) to the heater C through the transferring line 1, and the solution is heated by the heater C. The heated solution is then transferred to the evaporating can D, in which the pressure is beforehand reduced by the pressure-reducing line (vacuum pump) 5 and the transferred hydroxylamine solution is concentrated and distill by heating. When the solution is distilled under a reduced pressure, the liquid temperature is preferably kept as low as possible. The distilling conditions usually are in the range of 45 to 50° C./12 to 17 mmHg. By the distillation under that conditions, the solution is concentrated so that the content of hydroxylamine can become in the range of 70 to 90 wt. % (particularly 78 to 90 wt. %). Spatters of the solution splashing during the concentration are separated by equipment such as a spatter separator.

The concentrated solution gives vapor containing highly-purified hydroxylamine gas, in which impurities are decreased by separating the spatters. The aqueous hydroxylamine gas (distillate gas) is sent to the condenser E through the gas-transferring line 3 connecting to the upper part of the evaporating can D. Preferably, the inside surface of the apparatus including the gas-transferring line 3, where the distillate runs, is beforehand treated for making anticorrosive as described above or covered with anticorrosive material (e.g., polypropylene, polyethylene, polytetrafluoroethylene).

While the distillation is continuously performed, a residue of the concentrated solution accumulates in the evaporating can D. The residue contains impurities (metal components) in high contents, but it also contains the stabilizing agent. During the distillation, the concentrated solution is preferably controlled so that the contents of the stabilizing agent and impurities (particularly, iron) may be kept in the ranges of 0.0005 to 0.5 wt. % and less than approx. 5 ppm, respectively, based on the amount of the solution. For controlling the concentration of the solution, the distillation is preferably carried out while the residue is taken out. A portion of the residue is properly taken out through the circulating line 2 (which connects to the lower part of the evaporating can D) and the blow line 6, so as to keep hydroxylamine from decomposing and further to keep the amount of accumulated impurities at an allowed level. In order to effectively perform the distillation, the residue is mixed with a freshly supplied aqueous crude hydroxylamine solution, and the obtained mixture is again concentrated by heating. A portion of the residue may be removed before or after the residue is mixed with the freshly supplied crude solution, and then the remaining mixture may be concentrated by heating.

The highly-purified hydroxylamine gas is cooled and condensed in the condenser E, and the produced aqueous solution is introduced through the condensed liquid-transferring line 4 into the product tank F, in which the resulting solution is stored. The stabilizing agent, trans-1,2-diaminocyclohexane-N,N,N',N'-tetraacetic acid (CDTA) is preferably supplemented to thus obtained solution.

The prepared highly-concentrated and highly-purified aqueous hydroxylamine solution of the invention contains hydroxylamine in an amount of not less than 30 wt. %. The content of iron is not more than 10 ppb, preferably not more than 5 ppb, and more preferably not more than 3 ppb. The contents of metal components other than iron are not more than 5 ppb, preferably not more than 2 ppb, and more preferably not more than 1 ppb, for each component. In particular, each content of sodium and potassium is preferably not more than 2 ppb, and more preferably not more than 1 ppb. The resulting purified aqueous hydroxylamine solution of the invention contains the stabilizing agent of trans-1,2-diaminocyclohexane-N,N,N',N'-tetraacetic acid in an amount of 0.0005 to 0.5 wt. %.

The present invention is further described with the following non-restrictive working examples.

EXAMPLE 1

An aqueous hydroxylamine solution according to the invention was prepared from the crude solution by means of the distilling apparatus shown in Figure. The conditions for the preparation process were as follows.

(1) A spatter separator was provided to the evaporating can to separate spatters of the solution splashing during the concentration. The evaporating can and the gas-transferring line (through which the distillate gas runs) were made of stainless steel, and their inside surfaces were beforehand treated with a hydroxylamine salt. For the anticorrosive treatment, the inside surfaces were heated at approx. 100° C. at atmospheric pressure for 8 hours in the presence of an aqueous hydroxylamine-sulfate solution (20 wt. %).

(2) The starting material was an aqueous crude hydroxylamine solution of approx. 50 wt. % containing trans 1,2-diaminocyclohexane-N,N,N',N'-tetraacetic acid (stabilizing agent) in an amount of 0.005 wt. % based on the weight of the solution.

(3) Into the distilling apparatus, the starting material was continuously supplied from the material tank A at a rate of 250 L/hour. The resulting highly-purified aqueous hydroxylamine solution was produced at a rate of 230 L/hour, while the hydroxylamine solution containing a relatively high amount of impurities was taken out through the blow line at a rate of 20 L/hour.

(4) The conditions for distillation were controlled so that the liquid temperature in the evaporating can would be kept in the range of 45 to 50° C./12–17 mmHg.

Thus, an aqueous hydroxylamine solution of the invention containing hydroxylamine in the amount of approx. 50 wt. % was prepared. The contents of metal components in the prepared solution are set forth in Table 1. In Table 2, the contents of metal components in the starting material (i.e., aqueous crude hydroxylamine solution) are also shown.

TABLE 1

(1) aqueous hydroylamine solution of the invention
Metal components in the solution (ppb)

| Al | Ca | Cr | Cu | Fe | Pb | Mg | Mn | Ni | K | Na | Zn |
|---|---|---|---|---|---|---|---|---|---|---|---|
| 0.6 | 0.2 | 0.9 | 0.2 | 1–3.1 | <0.3 | 0.05 | 0.03 | 0.2 | <0.3 | <0.1 | 0.6 |

(2) crude aqueous hydroxylamine solution (starting material)

TABLE 2

Metal components in the solution (ppb)

| Al | Ca | Cr | Cu | Fe | Pb | Mg | Mn | Ni | K | Na | Zn |
|---|---|---|---|---|---|---|---|---|---|---|---|
| 65 | 5 | 8 | <1 | 42 | <1 | 3 | <1 | 4 | 32 | 23 | <1 |

The results in Table 1 indicate that the highly-purified aqueous hydroxylamine solution of the invention contains metal components (particularly iron, aluminum, and alkali metals such as sodium and potassium) in remarkably reduced amounts, as compared with the starting aqueous crude hydroxylamine solution.

What is claimed is:

1. An aqueous hydroxylamine solution containing hydroxylamine in an amount of not less than 30 weight %, which contains iron in an amount of not more than 10 ppb, metal components other than iron in an amount of not more than 5 ppb for each metal component and trans-1,2-diaminocyclohexane-N,N,N',N'-tetraacetic acid in an amount of 0.0005 to 0.5 weight %.

2. The aqueous hydroxylamine solution of claim 1, wherein the amount of iron is not more than 5 ppb.

3. The aqueous hydroxylamine solution of claim 1, wherein the amount of iron is not more than 3 ppb.

4. The aqueous hydroxylamine solution of claim 1, wherein each amount for sodium and potassium is not more than 2 ppb.

5. The aqueous hydroxylamine solution of claim 1, wherein each amount for sodium and potassium is not more than 1 ppb.

6. The aqueous hydroxylamine solution of claim 1, wherein the amounts of metal components other than iron are not more than 2 ppb for each.

7. A process for the preparation of the aqueous hydroxylamine solution of claim 1, comprising the steps of:

heating in a vessel an aqueous crude hydroxylamine solution containing 40 to 60 weight % of hydroxylamine and 15 to 200 ppb of iron, in the presence of trans-1,2-diaminocyclohexane-N,N,N',N'-tetraacetic acid in an amount of 0.0005 to 0.5 weight % based on the weight of the crude solution, to distill water off to give a concentrated aqueous hydroxylamine solution containing hydroxylamine in an amount of 70 to 95 weight %; and distilling the concentrated aqueous hydroxylamine solution to give an aqueous hydroxylamine distillate by means of a stainless steel-made distilling apparatus of which the inner surface has been previously treated with an aqueous hydroxylamine salt solution.

8. The process of claim 7, wherein the distilling apparatus is equipped with a device for keeping a distilled aqueous hydroxylamine solution from contamination with the concentrated solution which spatters in the vessel.

9. The process of claim 7, wherein the concentrated aqueous hydroxylamine solution is distilled, while a portion of the concentrated aqueous hydroxylamine solution is taken out from the vessel.

10. The process of claim 9, wherein the concentrated aqueous hydroxylamine solution taken out from the vessel is mixed with a freshly supplied aqueous crude hydroxylamine solution to give an aqueous mixture which is then supplied into the vessel.

11. The process of claim 10, wherein a portion of the concentrated aqueous hydroxylamine solution taken out from the vessel is wasted before the mixing.

12. The process of claim 7, wherein trans-1,2-diaminocyclohexane-N,N,N',N'-tetraacetic acid is supplemented to the aqueous hydroxylamine distillate.

* * * * *